June 11, 1957     T. O. LAINE     2,795,082
METHOD AND APPARATUS FOR FROST RESEARCH
Filed May 7, 1954
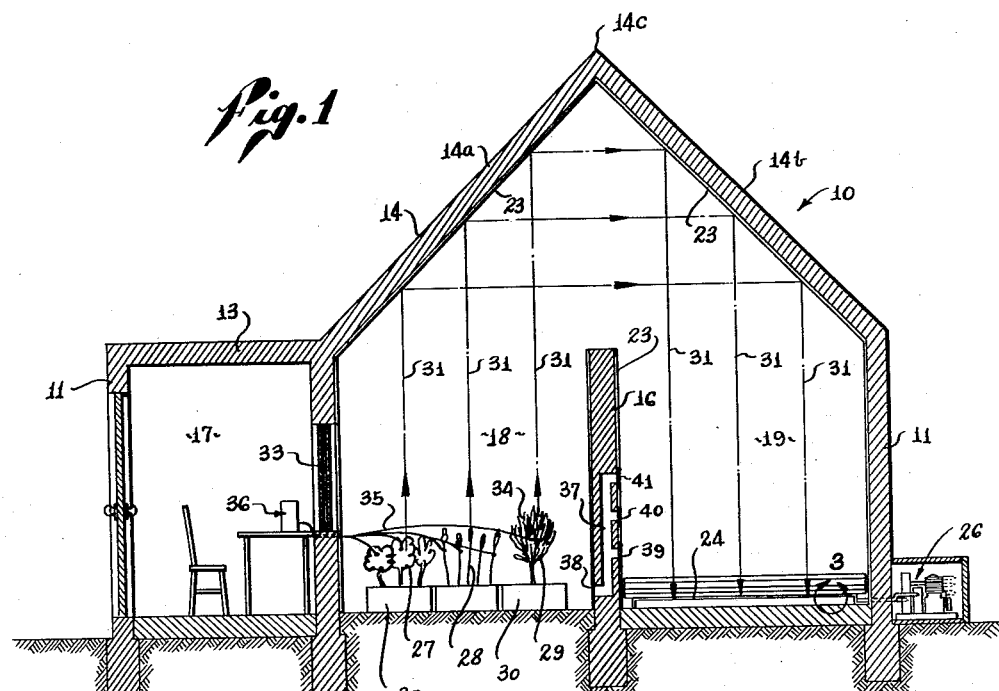
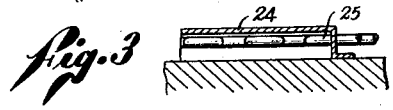
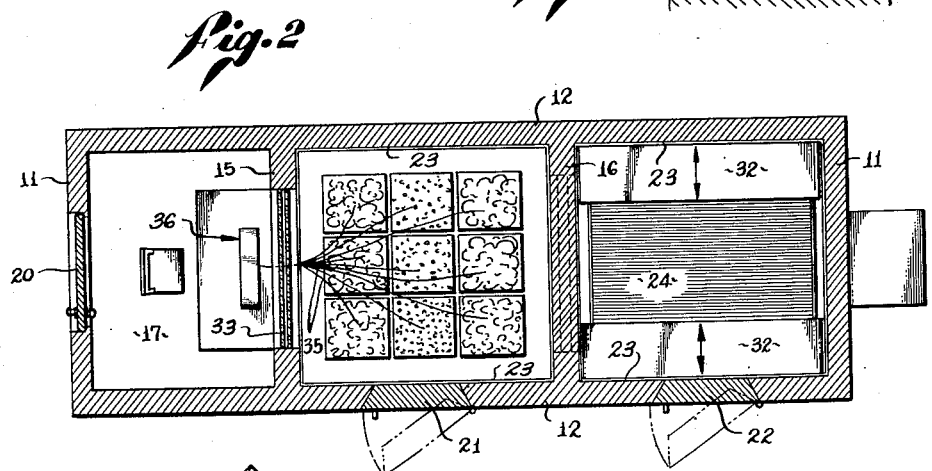
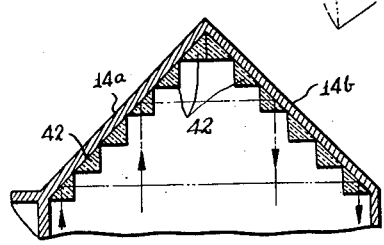
INVENTOR.
TAUNO O. LAINE United States Patent Office 2,795,082
Patented June 11, 1957

2,795,082
METHOD AND APPARATUS FOR FROST RESEARCH

Tauno O. Laine, Fontana, Calif.

Application May 7, 1954, Serial No. 428,329

12 Claims. (Cl. 47—58)

This invention relates to methods and apparatus for frost research and has particular reference to a laboratory method and apparatus for faithfully duplicating certain freezing conditions encountered in nature. The invention finds particular utility when employed in the study of the effects of frost and freezing conditions on plant life and in the investigation of frost prevention measures.

The periodic though relatively infrequent occurrence of freezing and frosting conditions in normally mild climates presents to the horticulturist a real and continuing problem. Such occasional frosts cause great damage to growing crops and under unusually extreme conditions oftentimes destroy not only the current crop but inflict severe damage and substantially destroy the growing plants. Because the destruction of crops because of severe frosts presents to the horticulturist a severe economic problem, a considerable amount of work has been done in the past and is presently being done in the development of preventive measures designed to minimize this economic loss.

The search for appropriate counter-measures has been directed principally along two relatively divergent lines: i. e., the search for appropriate methods and procedures for preventing the occurrence of frosting or freezing conditions, and attempts to develop or breed frost-resistant strains of various types of plants and trees.

Research along the lines indicated has been distinctly hampered by the lack of appropriate facilities for producing the necessary environmental conditions for carrying forward the investigation. To attempt to conduct such investigations in connection with the periodic frosting conditions occurring in nature is both time consuming and of doubtful value. The vagaries of changing climatic conditions, coupled with the fact that such frosting conditions occur only a few times each year in the relatively mild climates, prevent the carrying forward of a continuing and uninterrupted program of research. Furthermore, the geographical locations within which such research may be conducted are distinctly limited. Finally, it is of course impossible to effect any substantial control over naturally occurring frosting conditions, with the result that is substantially impossible to investigate methodically the effects of variations in the various conditions and circumstances desired to be studied.

It is therefore an object of this invention to provide a method and apparatus for frost research which permits the production and control of frosting conditions faithfully duplicating the conditions encountered in nature.

It is also an object of this invention to provide a method and apparatus of the character set forth in the preceding paragraph wherein plant life may be subjected to such frosting conditions, and wherein observations and measurements may be made without disturbing the plants or the conditions under which they are observed.

It is another object of this invention to provide a method and apparatus of the character set forth above wherein the plants are cooled by radiation.

It is an additional object of this invention to provide a method and apparatus of the character hereinabove referred to wherein the radiation of heat from the plants is caused to be most intense in the vertical direction, as in nature.

It is also an object of this invention to provide a method and apparatus of the character set forth in the preceding paragraphs wherein the environmental conditions characteristic of natural frosting conditions are duplicated by the minimization of air movement and convection, and by the creation of a temperature inversion involving a layer of relatively warm air above the plants.

Other objects and advantages of this invention will become apparent upon a study of the following specification read in connection with the accompanying drawings, wherein:

Figure 1 is a vertical sectional view of an apparatus which is particularly adapted to the practice of the method of this invention by which there are duplicated the frosting conditions normally occurring in nature;

Figure 2 is a horizontal sectional view of the apparatus shown in Figure 1;

Figure 3 is an enlarged fragmentary sectional view taken as indicated by the arcuate arrow 3 in Figure 1; and Figure 4 is a fragmentary vertical sectional view illustrating an alternative form of construction of a part of the apparatus shown in Figure 1.

There is illustrated in the accompanying drawings an apparatus which is particularly adapted to the practice of the method of this invention by means of which there are produced and controlled frosting conditions duplicating those encountered in nature. The frosting conditions most commonly encountered in nature in those geographical areas normally suited to horticultural activities result from the radiation of heat by plants and by the earth into the cold of outer space. In cultivated fields the bare earth is largely covered by growing crops with the result that the heat radiation and consequent cooling occurs principally through the growing plants.

Since most of the heat radiation which produces the declining temperatures resulting in frosting conditions comes from the growing plants, the plants cool first. The air in immediate contact with the plants is cooled by conduction and being heavier than the surrounding air remains hovering near the ground and the plants as a relatively thin layer of cold air. Immediately above this there is encountered a layer of warm air having a normal temperature gradient reaching the extremely cold air encountered at high altitudes. This temperature inversion, involving a layer of relatively cold air in the immediate vicinity of the plants and surmounted by a layer of warmer air, is characteristic of the frosting conditions usually encountered at night in normally mild climates.

Another circumstance characteristic of naturally occurring frosting conditions is that the radiation of heat is most intense in the upward direction. It is important in producing artificial frosting conditions to cause the principal heat radiation to occur vertically because plants that are characterized by large horizontal leaves cool most rapidly whereas plants having vertical needle-like foliage such as grasses and grain shoots cool more slowly.

The frost research apparatus of this invention is illustrated in Figure 1 as comprising an enclosure 10 which may conveniently take the form of a building defined by vertical walls 11, 12 surmounted by a roof structure 13, 14. The structure is preferably rectangular in plan as indicated in Figure 2, and is, by means of partitions 15 and 16, divided into three rooms or chambers; i. e. an observer's room 17, a treatment room 18, and a cold room 19. The walls, roofs, and partitions are all well insulated so as to isolate from the outside atmosphere the interior spaces defined by the rooms just mentioned, particularly the treatment room 18 and the cold room 19.

Access to the three spaces 17, 18, 19 may be had through appropriate access doors 20, 21, and 22.

As is best shown in Figure 1, the rooms 18 and 19 are surmounted by the roof 14 which is made in the form of a gabled roof, the sides 14a and 14b of which meet each other at right angles at the apex or ridge 14c. The partition 16 which is situated between the rooms 18 and 19 is terminated as shown in Figure 1 at a height substantially equal to the height of side walls 11, 12 of the structure. All interior surfaces of the walls, partitions, and roof within the rooms 18 and 19 are made highly reflective, as by being covered with a layer 23 of highly reflective material such as aluminum foil.

Near the floor of the cold room 19 there is placed a refrigerated plate 24, preferably black in color, and covering substantially the entire floor area of the cold room 19. Immediately beneath the plate 24 and in heat conducting association therewith are disposed a plurality of cooling coils 25. The coils 25 are connected in the conventional manner to a refrigeration apparatus indicated generally in Figure 1 by the reference character 26. By operating the refrigeration apparatus 26 and circulating a coolant through the coils 25, the plate 24 is refrigerated to a temperature of the order of −50° C. or −60° C.

Plant life such as the plants illustrated at 27, 28 and 29 in Figure 1, which are to be subjected to artificially created frosting conditions, are preferably grown outdoors in relatively deep boxes such as are indicated at 30 in Figure 1. When it is desired to subject the plants 27—29 to frosting conditions, the boxes 30 containing the plants are brought into the treatment room 18 and placed on the floor as indicated in Figures 1 and 2. When the plate 24 is refrigerated as described, heat is radiated upwardly by the plants 27—29 and reflected from the inclined reflecting surfaces 23 to the refrigerated plate 24 along paths such as are represented by the broken lines 31 in Figure 1. Since the side walls of the rooms 18 and 19 are also provided with interior reflective coatings, a certain amount of heat will be radiated obliquely from the plants 27—29 and after multiple reflections will reach the refrigerated plate 24. The intensity of this radiation is, because of the longer path and multiple reflections, less intense than the vertical radiation indicated by the broken lines 31, and in this respect duplicates the radiation conditions encountered in nature.

The intensity of the radiation of heat from the plants 27—29 may be regulated by controlling the temperature of the plate 24 or, and preferably, by adjusting the exposed area of the refrigerated plate. This may be accomplished conveniently through the use of movable shutters or screens 32 which may be so placed as to obscure a larger or smaller part of the plate 24 as desired.

It will at this point be observed that the frosting conditions produced by the apparatus thus far described duplicate the frosting conditions encountered in nature in that the cooling is accomplished by radiation of heat from the foliage of the plants under treatment. As in nature, the principal radiation is vertical with a smaller component at an angle to the vertical. The treatment room 18 being closed on the four sides by the walls 12 and partitions 15 and 16 is free of drafts and any substantial air movement. Furthermore, since the refrigerated plate 24 is located in an adjacent room and at a level no higher than that of the plants 27—29, there are substantially no air currents produced by convection. As a consequence, the temperature inversion characteristic of natural frosting conditions is produced in the treatment room 18.

Behavior of the plants during frosting conditions may be observed from the observer's room 17 through a window 33 placed conveniently in the partition 15. As is indicated in the drawing, the window 33 is preferably made of a plurality of sheets of glass spaced from each other to minimize the conduction of heat between the chambers 17 and 18.

Surface temperatures of the plants under treatment may be ascertained by affixing to the plants thermal responsive elements 34 connected as indicated by the lines 35 to remote indicating thermometers or equivalent apparatus indicated generally by the reference character 36.

The apparatus described may be used also to investigate the behavior of plant life under frosting conditions accompanied by the direct impingement of a current of cold air. To this end, there is provided within the partition 16 an air duct or passage 37 which communicates with the treatment room 18 at a relatively low elevation as indicated at 38 and which communicates with the cold room 19 at a plurality of different elevations as indicated at 39, 40 and 41. Each of the openings 38—41 is provided with a valve or damper to allow the intercommunication to be closed off entirely or established, as desired, between the opening 38 and a selected one or more of the openings 39—41. Since there exists in the air within the cold room 19 a considerable temperature gradient, it is possible by appropriate choice of the openings 39—41 to achieve a certain selection of the temperature of the air to be directed through the opening 38 into the treatment room 18 and around the plants 27—29.

According to a modification of the invention, reflection of the heat radiated upwardly from the plants 27—29 may be obtained through the use of a plurality of totally reflecting transparent prisms 42 secured to the inner surfaces of the sloping roof portions 14a and 14b in the manner illustrated in Figure 4.

From the foregoing it will be observed that this invention provides a method for producing artificially and under controlled conditions low temperature conditions of freezing and frosting duplicating the conditions encountered in nature. Attention is directed particularly to the use of the refrigerated plate 24 as a radiation sink disposed in an adjoining chamber and at a relatively low elevation and in cooperative relation with a pair of inclined reflectors disposed above the plant life being treated and above the refrigerated plate. It is by this construction that heat radiated from the plants is caused to be radiated principally in the vertical direction while convection currents resulting from contact of the air with the cold surface is prevented. This results in the establishment of the temperature inversion characteristic of the frosting condition encountered in nature. It will be observed that the apparatus described permits complete control of the frosting conditions to which the plant life is subjected and also permits direct observation of the behavior of the plants while, at the same time, temperature readings of the surface of the plants may be obtained at any desired locations through appropriate placement of the thermal responsive element 34.

While a preferred embodiment of this invention has been illustrated and described herein, the invention is not to be limited to the details so shown and described, except as defined in the appended claims.

I claim:

1. The method of subjecting plants to frosting conditions comparable to those occurring in nature which consists in establishing a cold surface in horizontally spaced relation to said plants and at substantially the same elevation, said cold surface having a temperature below zero centigrade, substantially confining on four sides and below the air surrounding said plants, and reflecting to said cold surface along paths of different lengths heat energy radiated from said plants, vertical radiation being directed along paths of minimum length.

2. The method of subjecting plants to frosting conditions comparable to those occurring in nature, which consists in establishing a cold surface in horizontally spaced relation to said plants and at substantially the same elevation, said cold surface having a temperature substantially below zero centigrade, insulating said plants against the conduction of heat toward and away from said plants, establishing in the atmosphere above said plants a temperature gradient characterized by a general reduction in temperature with altitude and having at least one temperature inversion to thereby prevent conduction of heat by convection away from said plants, and reflecting to said cold surface heat energy radiated upwardly from said plants.

3. A method of subjecting plants to frosting conditions comparable to those occurring in nature, which consists in establishing a cold surface in horizontally spaced relation to said plants and at substantially the same elevation, said cold surface having a temperature below zero centigrade, substantially confining on four sides and below the air surrounding said plants, reflecting to said cold surface along paths of different lengths heat energy radiated from said plants, vertical radiation being directed along the paths of minimum length, and adjusting the area of said cold surface exposed to said reflected heat energy to thereby control the rate of loss of heat by said plants.

4. The method of subjecting plants to frosting conditions comparable to those occurring in nature, which consists in refrigerating to a temperature substantially below zero centigrade a black body horizontally spaced from said plants and disposed at substantially the same elevation, insulating said plants to prevent the conduction of heat away from said plants, interposing a barrier between said plants and said body to prevent radiation of heat from said plants directly to said body, and disposing above said plants and above said body oppositely inclined reflecting surfaces to reflect toward said body along paths of different lengths heat energy radiated from said plants, and positioning said reflecting surfaces to provide a minimum path length for vertical radiation.

5. In an apparatus for subjecting test specimens to frosting conditions comparable to those occurring in nature, the combination of: means defining a treatment space for receiving said specimens; a cold body positioned at one side of said space and at substantially the same elevation as the lowermost portion of said space; means insulating said cold body and said specimens against conduction of heat therebetween; and reflector means above said treatment space for reflecting to said body heat energy radiated upwardly from said specimens.

6. In an apparatus for subjecting test specimens to frosting conditions comparable to those occurring in nature, the combination of: means defining a treatment space for receiving said specimens; a cold body positioned at one side of said space and at substantially the same elevation as the lowermost portion of said space; means insulating said cold body and said specimens against conduction of heat therebetween; means establishing in the atmosphere above said specimens, a temperature gradient characterized by a general reduction in temperature with altitude and having at least one temperature inversion to thereby prevent conduction of heat by convection away from said specimens; and reflector means above said treatment space for reflecting to said body heat energy radiated upwardly from said specimens.

7. In an apparatus for subjecting plants to frosting conditions comparable to those occurring in nature, the combination of: an enclosure comprising a floor surrounded by upstanding walls; a partition extending upwardly from said floor dividing the interior of said enclosure into two open-topped chambers; a body disposed in one of said chambers near the floor thereof; means for refrigerating said body; and a pair of oppositely inclined reflectors disposed above said chambers for reflecting to said body along paths of different lengths heat energy radiated from plants placed in the other of said chambers, said reflectors being disposed to provide a minimum path length for vertical radiation.

8. An apparatus according to claim 7 wherein said enclosure comprises a building, and wherein said reflectors are defined by the under surface of a gabled roof over said chambers positioned with the ridge thereof over and aligned with said partition.

9. An apparatus according to claim 7 which includes in one of said walls a transparent window to permit visual observation of said plants during treatment.

10. An apparatus according to claim 7 wherein said partition has a passage providing for the flow of air between said chambers, and wherein valve means are provided for closing said passage.

11. An apparatus according to claim 7 wherein said body comprises a horizontal plate having an area substantially equal to the area of the floor of said other chamber.

12. An apparatus according to claim 11 which includes a shutter means for adjusting the area of said plate exposed to radiant heat energy reflected by said reflectors.

References Cited in the file of this patent

UNITED STATES PATENTS

| | | |
|---|---|---|
| 805,801 | Kline | Nov. 28, 1905 |
| 2,193,921 | Gibbons | Mar. 19, 1940 |
| 2,243,931 | Webster | June 3, 1941 |
| 2,289,809 | Sherwood | July 14, 1942 |
| 2,336,733 | Hull | Dec. 14, 1943 |
| 2,408,867 | McCollum | Oct. 8, 1946 |
| 2,547,367 | Booth | Apr. 3, 1951 |
| 2,651,503 | Mills | Sept. 8, 1953 |

FOREIGN PATENTS

| | | |
|---|---|---|
| 400,791 | Great Britain | Nov. 2, 1933 |
| 138,406 | Sweden | Dec. 9, 1952 |